United States Patent Office 3,547,874
Patented Dec. 15, 1970

3,547,874
STABILIZATION OF POLYVINYL CHLORIDE
Keisuke Murayama and Syoji Morimura, Tokyo, Japan, assignors to Sankyo Company Limited, Tokyo, Japan
No Drawing. Filed Dec. 3, 1968, Ser. No. 780,892
Claims priority, application Japan, Dec. 11, 1967, 42/79,333
Int. Cl. C08f 45/60
U.S. Cl. 260—45.8                3 Claims

ABSTRACT OF THE DISCLOSURE

Polyvinyl chloride is stabilized against photo- and thermo-deterioration by having incorporated therein at least one compound selected from the 1,3,8-triaza-7,7-dimethyl - 9,9 - disubstituted - 2,4 - dioxo-[4.5]decane-8-oxyls in a sufficient amount to prevent such deterioration.

This invention relates to the stabilization of polyvinyl chloride. More particularly, it relates to the stabilization of polyvinyl chloride against the photo- and thermo-deterioration by having incorporated therein an effective amount of the piperidine-N-oxyl-spiro-hydantoin having the formula

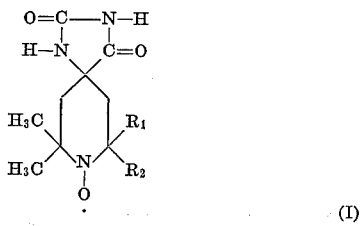

(I)

wherein $R_1$ and $R_2$ may be the same or different and represent alkyl group or they may be joined together with the carbon atom to which they are attached to form a saturated homocyclic ring or the group of the formula

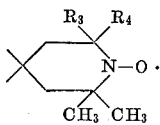

wherein $R_3$ and $R_4$ may be the same or different and represent alkyl group.

This invention also relates to the polyvinyl chloride thus stabilized.

In the above Formula I, the groups $R_1$ and $R_2$ individually may be illustrated by the following groups; namely, methyl, ethyl, n-propyl, isopropyl, n-butyl, isobutyl, hexyl, octyl, decyl and dodecyl. The cyclic groups which may be formed by the groups $R_1$ and $R_2$ with the carbon atom to which they are attached may be illustrated by those groups shown below:

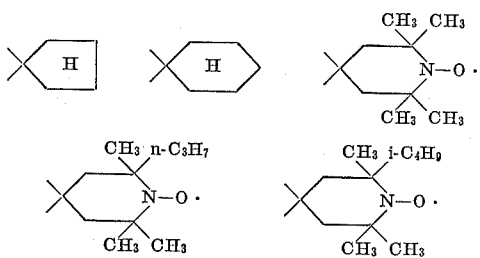

Representative examples of the piperidine-N-oxyl-spirohydantoins (I) which may be employed in this invention include the following hydantoins:

1,3,8-triaza-7,7,9,9-tetramethyl-2,4-dioxo-spiro[4.5]decane-8-oxyl;
cyclohexane-1-spiro-2'-(6',6'-dimethyl-piperidine-1'-oxyl)-4'-spiro-5''-hydantoin;
(2,2,6,6-tetramethylpiperidine-1-oxyl)-4-spiro-2'-(6',6'-dimethylpiperidine-1-oxyl)-4'-spiro-5''-hydantoin;
1,3,8-triaza-7-n-hexyl-7,9,9-trimethyl-2,4-dioxo-spiro[4.5]decane-8-oxyl;
1,3,8-triaza-7-isobutyl-7,9,9-trimethyl-2,4-dioxo-spiro[4.5]decane-8-oxyl;
1,3,8-triaza-7,7-diisobutyl-9,9-dimethyl-2,4-dioxo-spiro[4.5]decane-8-oxyl; and
cyclopentane-1-spiro-2'-(6',6'-dimethylpiperidine-1'-oxyl)-4'-spiro-5'-hydantoin.

Polyvinyl chloride frequently tends to be coloured and deteriorated with elimination of hydrogen chloride from polyvinyl chloride by action of light and heat. Therefore, the use of an excellent stabilizing agent is usually required in the polyvinyl chloride industry.

There have been heretofore proposed various stabilizers for the protection of polyvinyl chloride against such deterioration, for example, metallic salt of stearic acid such as calcium-, cadmium-, barium- and lead stearate; organic tin compound such as dibutyl tin laurate and dibutyl tin maleate; 2-(2'-hydroxy-5'-methylphenyl)-benzotriazole; 2-hydroxy - 4 - n - octoxybenzophenone; 1-bis(2-methyl - 4 - hydroxy - 5 - tert.-butylphenyl)-n-butane and the like.

Although these prior art stabilizers are widely employed in the art, these are not entirely satisfactory to prevent the deterioration of polyvinyl chloride. As a result of our extensive investigations on stabilizers, it has been unexpectedly found that the above-specified piperidine-N-oxyl-spiro-hydantoins of the Formula I exhibit an exceptionally high degree of stabilizing action on polyvinyl chloride against deterioration thereof.

Said compounds are found to have the following characteristic advantages:

(1) they exhibit a high degree of stabilizing action, as compared with the prior art stabilizers, on polyvinyl chloride against photo-deterioration thereof,
(2) they exhibit a high degree of stabilizing action on all various compositions containing polyvinyl chloride against photo-deterioration thereof,
(3) they show no appreciable degree of colouring action on polyvinyl chloride and can use together with plasticizers and other known stabilizers, without colouring of polyvinyl chloride or weakening of their stabilizing ability,
(4) they show little thermal sublimation and exudation,
(5) they exhibit excellent stabilizing action against thermo-deterioration as well as photo-deterioration, although the prior art stabilizers exhibit little or even negative stabilizing action against thermo-deterioration.

It is, therefore, an object of this invention to provide the polyvinyl chloride stabilized against photo- and thermo-deterioration by having incorporated therein an effective amount of the piperidine-N-oxyl-spiro-hydantoins of the Formula I.

The term "polyvinyl chloride" which is stabilized in this invention as used herein means to include monopolymer of vinyl chloride and copolymers of vinylchloride with vinyl acetate or other ethylenically unsaturated monomers. And, said polyvinyl chlorides may be blended with other resinous polymer such as acrylonitrilebutadiene-styrene resin.

These polyvinyl chlorides and blends thereof may be of any shape or form, for example, powder, filament, fiber, film, sheet and the like.

Where the piperidine-N-oxyl-spiro-hydantoins in this invention are to be employed for the purpose of stabilization, they may be readily incorporated into the polyvinyl chloride by various standard procedures commonly utilized in the art.

The stabilizer hydantoins in this invention may be incorporated into the polyvinyl chloride at any desired stage prior to the manufacture of shaped articles. For example, the dry stabilizer in a form of powder may be admixed with the polyvinyl chloride or a suspension or emulsion of the polyvinyl chloride may be admixed with a suspension or emulsion of the stabilizer of this invention.

The amount of the piperidine-N-oxyl-spiro-hydantoin to be employed in the polyvinyl chloride in accordance with this invention may be widely varied, depending upon the types, properties and particular uses of the polyvinyl chloride, but the stabilizer of this invention is usually and preferably employed in the range of concentrations of about 0.01–0.5% by weight, these concentrations being based upon the weight of the polyvinyl chloride employed. The hydantoins in this invention may be optionally and advantageously employed alone or in combination with other known stabilizers (including antioxidants and ultraviolet absorbents) such as metallic salt of stearic acid and organic tin compound; fillers; pigments and the like.

If necessary, an optional combination of two or more piperidine-N-oxyl-spiro-hydantoins in this invention may be satisfactorily employed in this invention to obtain the better results.

The piperidine-N-oxyl-spiro-hydantoins of the above Formula I are novel compounds unknown in the prior art. These piperidine-N-oxyl-spiro-hydantoins can be readily and advantageously prepared (a) by treating a piperidine-spiro-hydantoin compound having the formula

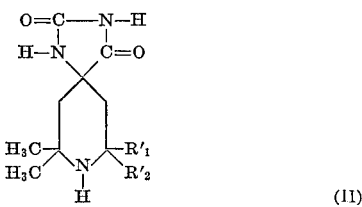

(II)

wherein $R'_1$ and $R'_2$ may be the same or different and represent alkyl group or they may be joined together with the carbon atom to which they are attached to form a saturated homocyclic ring or the group of the formula

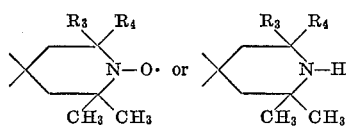

(wherein $R_3$ and $R_4$ are as defined above) with a peroxide or (b) by reacting a piperidine-N-oxyl compound having the formula

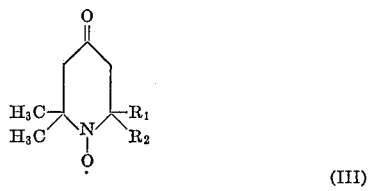

(III)

wherein $R_1$ and $R_2$ are as defined above with an alkali metal cyanide and ammonium carbonate.

For the purpose of illustrating the preparation of the piperidine-N-oxyl-spiro-hydantoins (I) as explained above, some particular embodiments of the preparation of such hydantoins are given below, this disclosure being incorporated herein solely as a reference.

PREPARATION 1

Preparation of 1,3,8-triaza-7,7,9,9-tetramethyl-2,4-dioxo-spiro[4.5]decane-8-oxyl To a solution of 20 g. of 1,3,8-triaza-7,7,9,9-tetramethyl-2,4-dioxo-spiro[4.5]decane in 80 ml. of acetic acid was added 0.5 g. of ethylenediaminetetraacetic acid, 0.4 g. of sodium tungstate and then 40 ml. of 30% hydrogen peroxide. The resulting mixture was stirred at room temperature for 7 days. Then, the reaction mixture was concentrated under reduced pressure, and to the residue thus obtained was added a saturated aqueous solution of potassium carbonate and then the resulting mixture was stirred at room temperature for 1 hour. Thereafter, the crystalline substance precipitated was recovered by filtration, washed with water, and then recrystallized from aqueous ethanol to give the desired product melting at 331° C. (decomp.).

*Analysis.*—Calculated for $C_{11}H_{18}O_3N_3$ (percent): C, 54.98; H, 7.55; N, 17.49. Found (percent): C, 55.19; H, 7.67; N, 17.45.

The electron spin resonance spectrum (in tetrahydrofuran) of the product thus obtained showed a strong triplet of a hyperfine coupling constant 14.3 oe., which triplet would be given by the splitting due to the interaction of the unpaired electron spin with nuclear spin of the N atom in the piperidine ring. This result evidently demonstrates the presence of a stable N-oxyl free radical in the product.

PREPARATION 2

Preparation of cyclohexane-1-spiro-2'-(6',6'-dimethyl-piperidine-1'-oxyl)-4'-spiro-5''-hydantoin A solution of 1.1 g. of 1-aza-2,2-dimethyl-4-oxo-spiro-[5.5]undecane-1-oxyl, 0.4 g. of sodium cyanide and 2.5 g. of ammonium carbonate in 20 ml. of 50% aqueous ethanol was stirred at 50–60° C. for 7 hours. Then, the reaction mixture was ice-cooled and the crystalline substance precipitated was recovered by filtration, washed with water and then recrystallized from aqueous ethanol to give the desired product melting at 282–283.5° C.

*Analysis.*—Calculated for $C_{14}H_{22}O_3N_3$ (percent): C, 59.98; H, 7.91; N, 14.99. Found (percent): C, 59.79; H, 7.82; N, 15.18.

The following examples are given solely for the purpose of illustrating that the piperidine-N-oxyl-spiro-hydantoins (I) exhibit an excellent stabilizing action on polyvinyl chloride against photo- and thermo-deterioration thereof.

In these examples, all parts are given by weight unless otherwise stated.

EXAMPLE 1

In a mortar, with 100 parts of polyvinyl chloride were intimately admixed 1.0 part of lead stearate, each 0.5 part of dibasic lead stearate $2PbO.Pb(C_{17}H_{35}COO)_2$, barium stearate and cadmium stearate and 0.05 part of the piperidine-N-oxyl-spiro-hydantoin in this invention specified in the following Table 1–1.

The resulting powder mixture was compression-moulded into a sheet of 0.5 mm. thick by rolling at 170° C. for 5 minutes.

For comparative purpose, the polyvinyl chloride sheets were prepared by repeating the same procedure as described above except that the other known stabilizer shown in the following Table 1–1 was employed instead of the stabilizer of this invention and that the stabilizer of this invention was omitted. In order to test for heat stability of the sheets prepared above, they were heated in Geer's oven at 175° C. and the time until the sheets would be coloured and deteriorated was measured. The results were summarized in the following Table 1-1.

TABLE 1-1

| Stabilizer | Time, minute | | | |
|---|---|---|---|---|
| | 20 | 40 | 60 | 80 |
| 1,3,8-triazo-7,7,9,9-tetramethyl-2,4-dioxo-spiro[4,5]decane 8-oxyl (Compound I). | Colourless | Pale yellow | Yellow | Yellow. |
| Cyclohexane-1-spiro-2'-(6',6'-di-methylpiperidine-1'-oxyl)-4'-spiro-5''-hydantoin (Compound II). | do | do | do | Do. |
| (2,2,6,6-tetramethylpiperidine-1-oxyl)-4-spiro-2'-(6',6'-dimethylpiperidine-1-oxyl)-4'-spiro-5''-hydantoin (Compound III). | do | do | do | Brown. |
| 2-(2'-hydroxy-5'-methylphenyl)benzotriazole (Control I) | Pale yellow | Brown | Black | |
| 2-hydroxy-4-n-octoxybenzophenone (Control II) | do | do | do | |
| None | do | do | do | |

Furthermore, in order to test for light stability of the sheets prepared above they were pressed under a pressure of 250 kg./cm.² for 5 minutes and then exposed to the artificial weather at 45° C. by means of the weather meter with sunshine carbon prescribed in the JIS-Z-0230.

The time until the sheets would be coloured and deteriorated was measured.

The results were summarized in the following Table 1-2.

TABLE 1-2

| Stabilizer | Time, hour | | |
|---|---|---|---|
| | 550 | 1,340 | 1,730 |
| Compound I | Colourless | Colourless | Pale brown. |
| Compound II | do | do | Do. |
| Compound III | do | do | Do. |
| Control I | do | do | Brown. |
| Control II | do | do | Do. |
| None | do | Brown | Black. |

EXAMPLE 2

In a mortar, with 100 parts of polyvinyl chloride were intimately admixed 40 parts of dioctyl phthalate as a plasticizer, each 0.5 part of cadium stearate and barium stearate, 2 parts of LA-617F (trade name of a liquid stabilizer of cadmium-barium system manufactured and sold by Sankyo Yukigosei Co., Ltd., Japan) and 0.05 part of the piperidine-N-oxyl-spiro-hydantoin in this invention specified in the following Table 2-1. The resulting powder mixture was compression-molded into a soft polyvinyl chloride sheet of 0.5 mm. thick by rolling at 170° C. for 5 minutes.

For comparative purpose, the polyvinyl chloride sheets were prepared by repeating the same procedure as described above except that the other known stabilizer shown in the following Table 2-1 was employed instead of the stabilizer of this invention and that the stabilizer of this invention was omitted. In order to test for heat stability of the sheets prepared above, the colouring and deteriorating time were measured by employing the same procedure and condition as described in the above Example 1.

The test results are summarized in the following Table 2-1.

TABLE 2-1

| Stabilizer | Time, minute | | | |
|---|---|---|---|---|
| | 60 | 80 | 100 | 120 |
| Compound I | Colourless | Pale yellow | Pale yellow | Pale yellow. |
| Compound II | do | do | do | Do. |
| Compound III | do | do | do | Yellow-brown. |
| Control I | do | Yellow | Brown | Brown. |
| Control II | do | Pale yellow | Yellow | Do. |
| None | do | Brown | Black | |

Furthermore, in order to test for light stability of the sheets which were prepared as above, they were pressed under a pressure of 20 kg./cm.² for 4 minutes and then exposed to the artificial weather at 45° C. by means of the weather meter with sunshine carbon prescribed in the JIS-Z-0230.

The time until the sheets would be coloured and deteriorated was measured.

The results were summarized in the following Table 2-2.

TABLE 2-2

| Stabilizer | Time, hour | |
|---|---|---|
| | 1,670 | 2,500 |
| Compound I | Colourless | Colourless. |
| Compound II | do | Do. |
| Compound III | do | Do. |
| Control I | do | Pale brown. |
| Control II | do | Colourless. |
| None | Pale brown | Brown. |

EXAMPLE 3

In a mortar, with 100 parts of polyvinyl chloride were intimately admixed 3 parts of dibutyl tin maleate, 0.5 part of butyl stearate and 0.15 part of the piperidine-N-oxyl-spiro-hydantoin of this invention specified in the following Table 3-1. The resulting powder mixture was compression-molded into a soft polyvinyl chloride sheet of 0.5 mm. thick by rolling at 180° C. for 5 minutes. For comparative purpose, the polyvinyl chloride sheets were prepared by repeating the same procedure as described above except that the other known stabilizer shown in the following Table 3-1 was employed instead of the stabilizer of this invention and that the stabilizer of this invention was omitted.

In order to test for heat stability of the sheets prepared above, the colouring and deteriorating time were measured by employing the same procedure and condition as described in the above Example 1.

The test results are summarized in the following Table 3-1.

TABLE 3-1

| Stabilizer | Time, minute | | | | |
|---|---|---|---|---|---|
| | 45 | 60 | 75 | 90 | 105 |
| Compound I | Pale yellow | Pale yellow | Pale yellow | Yellow | Dark yellow. |
| Compound II | do | do | do | do | Do. |
| Compound III | do | do | do | do | Do. |
| Control I | do | do | Pale green | Greyish green | Dark brown. |
| Control II | do | do | do | do | Do. |
| None | do | do | do | do | Black brown. |

Furthermore, in order to test for light stability of the sheets which were prepared as above, they were pressed under a pressure of 250 kg./cm.² for 5 minutes and then the colouring and deteriorating time was measured by employing the same procedure and condition as described in the above Example 1.

The test results are summarized in the following Table 3–2.

TABLE 3–2

| Stabilizer | Time, hour | | |
|---|---|---|---|
| | 550 | 1,340 | 1,730 |
| Compound I | Colourless | Colourless | Colourless. |
| Compound II | do | do | Do. |
| Compound III | do | do | Do. |
| Control I | do | do | Faint brown. |
| Control II | do | Grey-black | Black. |
| None | do | Greyish black | Do. |

EXAMPLE 4

In a mortar, with 100 parts of polyvinyl chloride were intimately admixed 40 parts of dioctyl phthalate and 0.1 part of the piperidine-N-oxyl-spiro-hydantoin of this invention specified in the following Table 4. The resulting powder mixture was compression-molded into a sheet of 0.5 mm. thick by rolling at 140° C. for 5 minutes. For comparative purpose, the polyvinyl chloride sheets were prepared by repeating the same procedure as described above except that the other known stabilizer shown in the following Table 4 was employed instead of the stabilizer of this invention and that the stabilizer of this invention was omitted.

In order to test for light stability of the sheets prepared above, the time of discolouring to brown were measured by means of exposing to the artificial weather at 45° C. by means of the weather meter with sunshine carbon prescribed in the JIS–Z–0230.

Furthermore, in order to test for heat stability of the sheets which were prepared as above, they were tested for the time of discolouring to black under heating at 160° C. in Geer's oven. The results was summarized in the following Table 4.

TABLE 4

| Stabilizer | Discolouring time | |
|---|---|---|
| | The time of discolouring to brown at 45° C. (hour) | The time of discolouring to black at 160° C. (minute) |
| Compound I | 400 | 105 |
| Compound II | 320 | 90 |
| Compound III | 380 | 90 |
| Control I | 200 | 60 |
| None | 300 | 50 |

EXAMPLE 5

In a mortar, with 100 parts of polyvinyl chloride were intimately admixed 30 parts of Kaneka B–16 (trade name of acrylonitrile-butadiene-styrene resin manufactured and sold by Kanegafuchi Chemical Industries Co., Ltd., Japan), 0.5 part of cadmium stearate, 0.5 part of barium stearate, 1.0 part of dibasic lead phosphite and 0.5 part of the above-defined Compound I.

The resulting powder mixture was compression-molded into a sheet of 0.5 mm. thick by rolling at 160° C. for 8 minutes.

After the sheets were exposed to the artificial weather at 45° C. for 50 hours by means of the weather meter with sunshine carbon prescribed in the JIS–Z–0230, they were tested for the tensile impact strength retention according to the method prescribed in the ASTM D–1822 61T.

The results were summarized in the following Table 5.

TABLE 5

| Stabilizer | Tensile impact strength retention, percent |
|---|---|
| Compound I | 68 |
| None | 21 |

It will be apparent from the results summarized in the above tables of Examples 1 to 5 that the piperidine-N-oxyl-spiro-hydantoins (I) of this invention show excellent stabilizing action on polyvinyl chloride against the photo- and thermo-deterioration thereof, as compared with those known stabilizers.

What is claimed is:

1. Polyvinyl chloride stabilized against deterioration by light and heat wherein there is incorporated, in a sufficient amount to prevent the deterioration, a compound having the formula

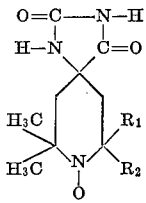

wherein $R_1$ and $R_2$ may be the same or different and represent alkyl group or they may be joined together with the carbon atom to which they are attached to form a saturated homocyclic ring or the group of the formula

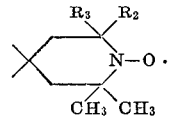

wherein $R_3$ and $R_4$ may be the same or different and represent alkyl group

2. The polyvinyl chloride according to claim 1 wherein the said compound is selected from the group consisting of 1,3,8 - triaza - 7,7,9,9 - tetramethyl - 2,4 - dioxo - spiro-[4,5]decane - 8 - oxyl, cyclohexane - 1 - spiro-2' - (6',6' - dimethylpiperidine - 1' - oxyl) - 4' - spiro-5" - hydantoin, and (2,2,6,6 - tetramethylpiperidine-1 - oxyl) - 4 - spiro - 2' - (6',6' - dimethylpiperidine-1'-oxyl)-4'-spiro-5"-hydantoin.

3. The polyvinyl chloride according to claim 1 wherein there is incorporated an amount of 0.01–0.5% by weight, based upon the polyvinyl chloride, of a compound selected from the group consisting of 1,3,8 - triaza - 7,7,9,9 - tetramethyl - 2,4 - dioxo - spiro [4,5]decane - 8 - oxyl, cyclohexane - 1 - spiro-2' - (6',6' - dimethylpiperidine - 1' - oxyl) - 4' - spiro-5" - hydantoin, and (2,2,6,6 - tetramethylpiperidine-1 - oxyl) - 4 - spiro - 2' - (6',6' - dimethylpiperidine-1'-oxyl)-4'-spiro-5"-hydantoin.

References Cited

UNITED STATES PATENTS 2,441,360   5/1948   Kamin _____ 260—45.8
3,474,068   10/1969  Murayama et al. ____ 260—45.8

DONALD E. CZAJA, Primary Examiner

R. A. WHITE, Assistant Examiner

U.S. Cl. X.R.

260—23, 45.75